United States Patent
Soldano

(10) Patent No.: US 12,471,574 B1
(45) Date of Patent: Nov. 18, 2025

(54) DIAL-A-BEAK

(71) Applicant: Roger Soldano, Charlevoix, MI (US)

(72) Inventor: Roger Soldano, Charlevoix, MI (US)

(*) Notice: Subject to any disclaimer, the term of this patent is extended or adjusted under 35 U.S.C. 154(b) by 0 days.

(21) Appl. No.: 19/062,763

(22) Filed: Feb. 25, 2025

(51) Int. Cl.
*A01K 39/01* (2006.01)

(52) U.S. Cl.
CPC ...... *A01K 39/0113* (2013.01); *A01K 39/0106* (2013.01)

(58) Field of Classification Search
CPC ........ A01K 39/00; A01K 39/01; A01K 39/04; A01K 39/0106; A01K 39/0113
USPC ............................................ 119/51.01, 51.03
See application file for complete search history.

(56) References Cited

U.S. PATENT DOCUMENTS

| | | | | |
|---|---|---|---|---|
| 1,119,413 A * | 12/1914 | Dreibelbis | ............... | A01K 1/10 119/60 |
| 1,123,501 A * | 1/1915 | Dreibelbis | ........... | A01K 5/0114 119/51.01 |
| 2,504,282 A * | 4/1950 | Tobias | ............... | A01K 39/0106 40/647 |
| 3,273,537 A * | 9/1966 | Orr | ......................... | A01K 1/10 119/60 |
| 3,399,650 A | 9/1968 | Goodman | | |
| 3,927,645 A | 12/1975 | Varner | | |
| 4,188,913 A | 2/1980 | Earl et al. | | |
| 5,165,363 A | 11/1992 | McGinty | | |
| 5,704,312 A | 1/1998 | Fintel | | |
| 5,894,813 A | 4/1999 | George | | |
| 6,321,686 B2 | 11/2001 | Geis | | |
| 8,794,184 B2 * | 8/2014 | Cote | ................... | A01K 39/0106 119/52.3 |
| 10,531,644 B2 * | 1/2020 | Cote | ................... | A01K 39/0106 |
| 10,687,517 B2 | 6/2020 | Tribble | | |
| 2011/0174233 A1 * | 7/2011 | Lush | ................... | A01K 39/0113 119/498 |
| 2013/0061810 A1 * | 3/2013 | Van Dyk | ............ | A01K 39/0106 119/61.31 |

* cited by examiner

*Primary Examiner* — Peter M Poon
*Assistant Examiner* — Danielle A Clerkley

(57) ABSTRACT

An adjustable bird feeder designed to regulate access to food based on the beak length and feeding behavior of different bird species. The feeder includes at least one food cage positioned within a frame and at least one movable face located adjacent to the food cage. A user-operated adjustment mechanism, comprising a threaded rod and control knob, moves the face toward or away from the food cage. In the spring-assisted configuration, compression springs provide controlled face retraction. In the single-cage configuration, the face is adjusted without springs, utilizing guide rails for stability. The feeder's design allows the food cage to be aligned or offset with the front grill to adjust the aperture size. Integrated crumb collection trays and aluminum fittings provide structural protection and durability. The feeder accommodates various food types, including suet, seeds, and nuts, by modifying the cage design. The configuration deters squirrels through controlled spatial access.

12 Claims, 11 Drawing Sheets

DIAL-A-BEAK

PRIOR ART

U.S. Pat. No. 5,704,312A describes a feeder designed to accommodate woodpeckers' long tongues and bills while deterring pest birds. It utilizes specific slot dimensions but lacks a movable face mechanism. The Dial-A-Beak invention introduces a user-controlled adjustable face that moves via a threaded rod and knob assembly. Unlike U.S. Pat. No. 5,704,312A's static slot dimensions, Dial-A-Beak allows dynamic adjustments, enabling users to fine-tune access based on beak length and mandible function. Additionally, the spring-assisted mechanism or threaded rod and knob only ensures smooth adjustments, a feature absent in the cited patent.

U.S. Pat. No. 4,188,913A focuses on adjustable dispensing means for seeds of various sizes but does not address suet feeders or mechanisms for separating birds by beak length. Unlike U.S. Pat. No. 4,188,913A, which targets seed dispensing, Dial-A-Beak is designed explicitly for suet feeding, with an innovative movable face that adjusts access based on anatomical features. The adjustable face mechanism is unique and not disclosed in U.S. Pat. No. 4,188,913A.

U.S. Pat. No. 10,687,517B2 discusses a portable feeding device with a telescoping support member but lacks mechanisms related to suet feeders or selective access based on beak length. Dial-A-Beak differentiates itself through its selective feeding mechanism, allowing access adjustments based on beak length and feeding behavior, which is not addressed in U.S. Pat. No. 10,687,517B2. The spring-assisted movable face or the knob and threaded rod only on the single version further distinguishes the invention.

U.S. Pat. No. 3,927,645A provides a general bird feeder design but does not incorporate mechanisms for adjustable access based on beak length. The Dial-A-Beak feeder introduces a dynamic, user-controlled adjustment system using a threaded rod and/or spring mechanism. The ability to adjust feeding access based on anatomical differences sets it apart from the static design disclosed in U.S. Pat. No. 3,927,645A.

U.S. Pat. No. 6,321,686B2 features adjustable feeding openings but lacks a movable face that adjusts the feeding gap based on beak length. While U.S. Pat. No. 6,321,686B2 discusses adjustable openings, Dial-A-Beak provides a movable face controlled by a spring-assisted threaded rod or knob and threaded rod, allowing continuous adjustment of the feeding distance. This dynamic feature, tailored for specific beak lengths and mandible use, is not present in U.S. Pat. No. 6,321,686B2.

U.S. Pat. No. 6,253,707B1 describes an adjustably selective bird feeder featuring a movable shroud designed to protect and isolate access openings, allowing selective feeding. Unlike this design, the Dial-A-Beak feeder uses a movable face to selectively control access based specifically on beak length, providing a continuously adjustable feeding distance rather than relying on static shroud openings.

U.S. Pat. No. 6,401,658B1 discloses a height-adjustable bird feeder that enables raising or lowering relative to a stationary pole. This design focuses on adjusting the feeder's height, not on controlling feeding access based on anatomical features such as beak length. Dial-A-Beak differs by offering user-controlled facial adjustments adjacent to the food cage, allowing dynamic access control tailored to specific species.

U.S. Pat. No. 7,743,732B1 covers a bird feeder equipped with an adjustable sealing feeding port that can be moved to secure or expose bird food. Dial-A-Beak differs by enabling continuous adjustment of access distance between a movable face and the food cage, rather than simply sealing or opening feeding ports. The distance-based control in Dial-A-Beak allows for selective feeding based on species-specific anatomical traits, a feature not addressed in U.S. Pat. No. 7,743,732B1.

U.S. Pat. No. 9,839,203B1 relates to a platform bird feeder that includes an adjustable baffle. The baffle's adjustability focuses on disrupting feeding by undesirable species but does not provide distance control between a movable face and the food cage. Dial-A-Beak's species-selective feeding mechanism based on beak length and mandible use is distinct, offering anatomical selectivity not present in the adjustable baffle design.

U.S. Pat. No. 5,195,460A describes a tube-shaped bird feeder with a tiltable perch, enabling control over the maximum weight of a feeding bird. This weight-based selectivity differs fundamentally from Dial-A-Beak's anatomical access control mechanism, which allows adjustments based solely on beak length and mandible function, independent of the bird's weight.

U.S. Pat. No. 2,504,282A discusses a general feeding apparatus without species-specific access control mechanisms. Unlike U.S. Pat. No. 2,504,282A, Dial-A-Beak introduces a species-selective feeding system based on beak length, facilitated by an adjustable face mechanism. The user-controlled adjustability is a novel feature that distinguishes the invention.

U.S. Pat. No. 5,165,363A describes a selective feeder but does not utilize a movable face adjusted by a threaded rod and spring mechanism or knob and threaded rod. Dial-A-Beak employs a movable face system for species-selective feeding, a mechanism not disclosed in U.S. Pat. No. 5,165,363A. The spring-assisted, user-controlled adjustments provide unique functionality.

U.S. Pat. No. 5,894,813A discusses adjustable feeding ports but lacks a mechanism for selective feeding based on beak length. Unlike U.S. Pat. No. 5,894,813A, which focuses on port adjustment, Dial-A-Beak regulates access via a movable face mechanism, dynamically adjusting feeding access based on anatomical features.

U.S. Pat. No. 3,399,650A provides a general bird feeder design but lacks any adjustable mechanism based on beak length. The Dial-A-Beak invention introduces a movable face controlled by a threaded rod and spring system or knob and threaded rod, providing adjustable access tailored to specific beak lengths and feeding behaviors, distinguishing it from the static design in U.S. Pat. No. 3,399,650A.

BACKGROUND OF THE INVENTION

The present invention relates generally to bird feeders and, more specifically, to adjustable bird feeders designed to regulate access to bird food based on the anatomical characteristics and feeding behaviors of various bird species. The invention provides a mechanism that allows users to adjust the feeding access distance based on different birds' beak lengths and mandible functions. This enables selective feeding of desired species, such as woodpeckers, while deterring nuisance birds.

Traditional bird feeders, including those designed for suet cakes, typically lack selectivity in terms of which species can access the feed. Feeders with open access often attract aggressive or undesirable bird species, such as starlings, grackles, and bluejays. These birds tend to dominate the feeder, preventing smaller or more desirable species from feeding. As a result, feed is consumed rapidly by nuisance species, leading to increased costs for the user and decreased opportunities for desired bird species to feed.

Various attempts have been made in the prior art to address selective feeding. For example, some feeders use fixed slot dimensions or cages with small rectangular holes that physically limit access based on overall bird size. However, these designs often lack the flexibility needed to accommodate variations in beak length among desirable species. Additionally, fixed-opening designs may make it difficult for certain birds to access all portions of the feed, leading to feed wastage when uneaten food becomes moldy or rancid.

Another approach in the prior art involves the use of weight-sensitive perches or adjustable seed ports. While these designs can deter certain heavier or larger birds, they are typically not effective for suet feeders or for selectively controlling access based on anatomical features such as beak length. Moreover, weight-sensitive mechanisms may be prone to mechanical failure and require regular maintenance, limiting their long-term reliability.

Some woodpecker feeders attempt to address species selectivity by utilizing small holes in a casing or limiting access based on the tongue length of woodpeckers. However, such feeders often fail because they provide limited access to the feed, resulting in user dissatisfaction and feed spoilage. Birds may not readily adapt to feeders that are difficult to use, further reducing the effectiveness of these designs.

Despite these attempts, there remains a need for an adjustable bird feeder that allows users to control feeding access dynamically, based on the anatomical features of different bird species. A feeder that can adjust the distance between a movable face and a food cage would enable selective feeding of desired species while deterring nuisance species. Additionally, such a design would reduce feed wastage by ensuring that all feed remains accessible to the intended birds.

The present invention addresses these long-standing problems by introducing a user-controlled, adjustable face mechanism that selectively regulates feeding access based on beak length and mandible function. The invention also incorporates adjustable slot apertures on the food cage to provide an additional layer of selectivity. The spring-assisted movement of the adjustable face ensures smooth operation and precise control, distinguishing the invention from existing feeders that rely on fixed openings or weight-sensitive mechanisms.

In summary, the present invention fills a critical gap in the field of bird feeders by providing a flexible, user-adjustable solution that accommodates variations in bird anatomy and behavior. The Dial-A-Beak adjustable bird feeder represents a significant improvement over prior art by offering dynamic feeding control, reducing feed wastage, and increasing user satisfaction through reliable, maintenance-free operation.

SUMMARY OF THE INVENTION

The present invention, referred to as the "Dial-A-Beak" adjustable bird feeder, provides a novel solution for selective feeding of bird species based on anatomical characteristics such as beak length and mandible function. The invention offers a user-controlled mechanism that allows precise adjustment of the distance between a movable face and a food cage. By turning a control knob connected to a threaded rod, users can advance or retract the face, thereby regulating access to the food. The clockwise rotation of the knob compresses springs located at the corners of the face, decreasing the distance between the face and the food cage and allowing birds with shorter beaks to access the food. Conversely, counterclockwise rotation releases the springs, increasing the distance and restricting access to shorter-beaked birds, thereby favoring species such as woodpeckers.

In an alternative single-sided embodiment, the feeder operates on the same principle of adjusting the distance between the face and the food but uses a simpler mechanism that does not require springs. In this configuration, the face is guided along support structures, and the rotational momentum of the threaded rod and knob assembly enables movement. This design provides a more streamlined construction while maintaining the selective feeding functionality of the primary embodiment.

The invention also includes adjustable slot apertures on the food cage, which provide an additional layer of selectivity by controlling access based on how different bird species use their mandibles to grasp food. While suet is the primary food source intended for use with the Dial-A-Beak feeder, the design can be adapted for other types of bird food, such as seeds, nuts, and fruits, by modifying the cage to accommodate various food forms.

Another significant feature of the invention is its ability to deter nuisance animals such as squirrels. Even at relatively small distances between the movable face and the food cage, squirrels cannot reach the food, providing an effective deterrent without additional barriers or complex mechanisms.

The Dial-A-Beak feeder can be configured with a single or double-sided design, allowing for flexibility in various environments. In the double-sided configuration, two stacked suet cages can be independently adjusted using separate knobs and threaded rod assemblies. This enables users to cater to different species on each side by customizing the feeding distance according to the anatomical requirements of the target birds.

The Dial-A-Beak adjustable bird feeder provides a versatile, user-controlled feeding solution that dynamically accommodates the anatomical differences among bird species. Its unique combination of a movable face mechanism, spring-assisted or springless operation, adjustable cage apertures, and adaptability for various food types substantially improve existing feeders. The invention reduces feed wastage, enhances user satisfaction, and provides reliable, maintenance-free operation, representing a significant advancement in the field of bird-feeding technology.

Figure 1:
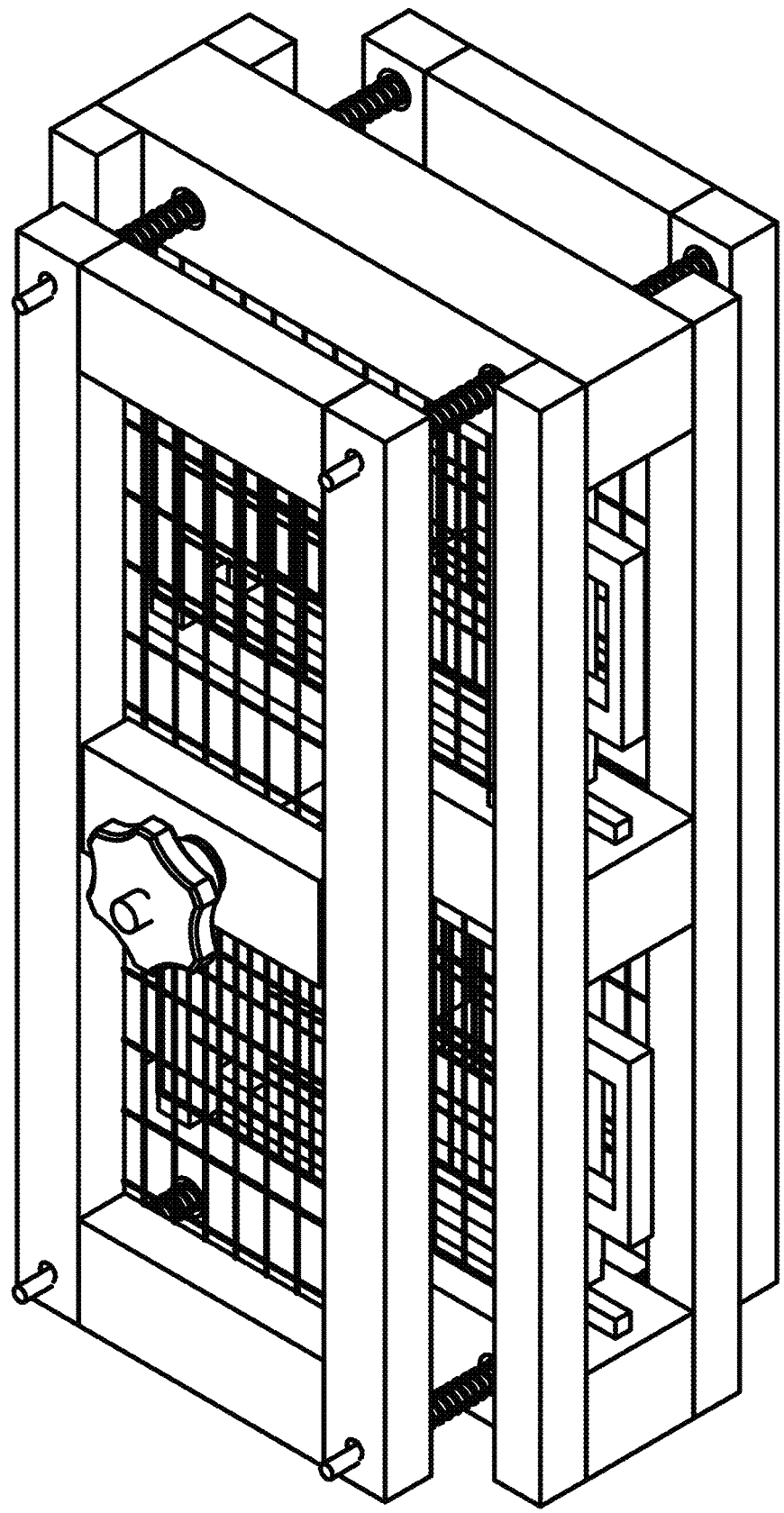
FIG. 1 is a perspective view of the assembled Dial-A-Beak adjustable bird feeder, illustrating the overall three-dimensional configuration. The figure shows the primary structural components, including the lower, middle, and top frame support. The movable faces are depicted in their operational position, positioned adjacent to the food cages stacked within the frame slots. One Control knob is shown on the front side of the feeder, connected by a threaded rod that allows the faces to move forward or backward. The back face is identical to the front face with the same parts. Compression springs are located along the spring guides positioned at each corner of the frame, facilitating controlled face adjustments. The corner frame supports ensure structural integrity, while washers placed on the threaded rod allow smooth rotation of the control knobs. This perspective view highlights the spatial relationship between the movable faces, food cages, and frame structure, demonstrating the device's ability to regulate feeding access based on beak length. This view and others that follow intentionally omit the side covers, roof, and other aesthetic parts to provide a clear understanding of the design's internal adjustment mechanism and overall mechanical operation.
Figure 2:
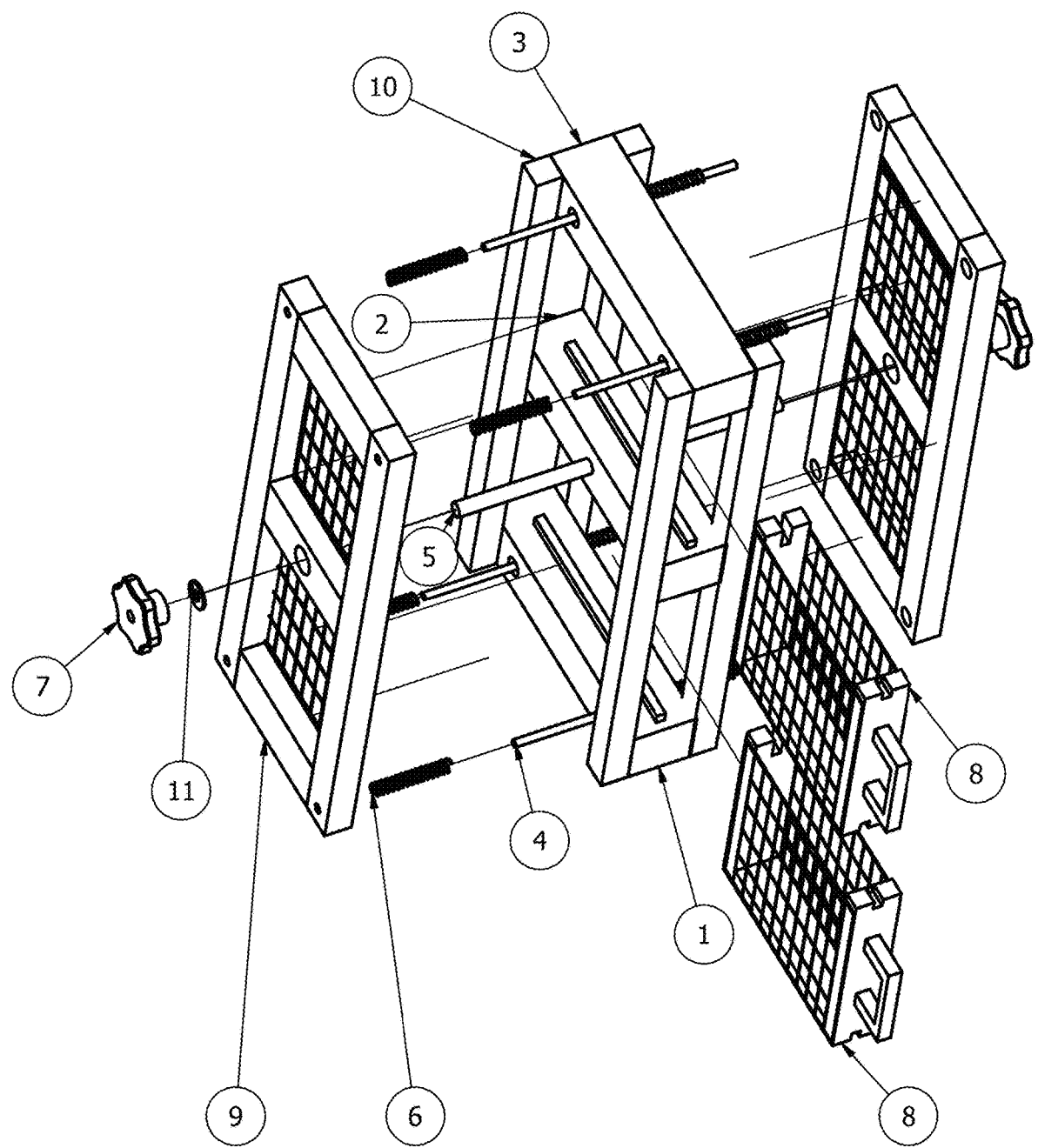
FIG. 2 is an exploded perspective view of the Dial-A-Beak adjustable bird feeder, illustrating the spring-assisted model's major structural and functional components. The lower frame support (1) is the foundational structure positioned at the bottom of the feeder frame and also supports the spring guides (4). The middle frame support (2) is positioned centrally within the feeder frame to provide additional structural stability. The top frame support (3) secures the uppermost section of the feeder frame. The spring guides (4) are located at each corner of the frame, designed to extrude through both the front and rear faces and provide a path for the compression springs (6). The threaded rod (5) runs through both front and rear faces, enabling face movement via rotation. The compression springs (6), four positioned on each face, fit over the spring guides (4) to provide the spring-assisted mechanism for face adjustment. The control knob (7) is attached to each end of the threaded rod (5), allowing clockwise and counterclockwise adjustments to control face movement. The food cages (8) fit into the frame slots stacked on each other, designed to hold bird food and provide access control through the adjustable faces (9). The faces (9) are situated at the front and rear of the feeder and regulate access to the food based on beak length. The frame supports (10) are positioned at each corner of the feeder frame, providing overall structural integrity. Washers (11) are placed over the threaded rod (5) at the front and rear faces, ensuring a smooth surface for control knob rotation.
Figure 2A:
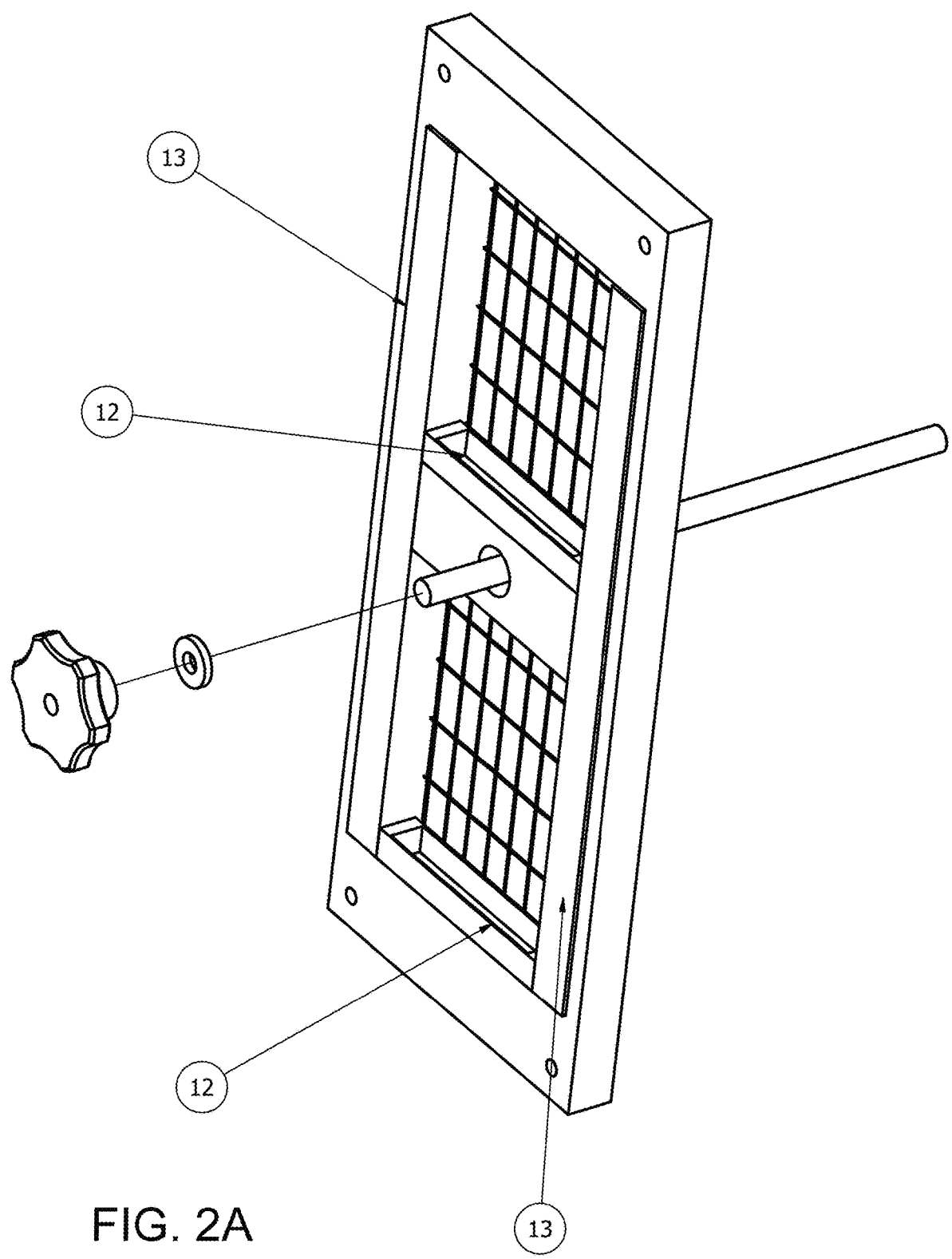
FIG. 2A continues the exploded perspective view shown in FIG. 2 and illustrates additional Dial-A-Beak adjustable bird feeder components. The angled aluminum fittings (13) are located on each side of the front and back faces, providing structural support and protecting the faces from damage caused by bird beaks during feeding. The crumb collection trays (12) are positioned at the bottom of each feeding compartment, designed to collect food fragments that fall during feeding, allowing birds to access the fallen food while protecting the middle and bottom portions of the feeder frame. The figure highlights the integration of these components within the overall frame structure, contributing to the durability and functional efficiency of the device.
Figure 2B:
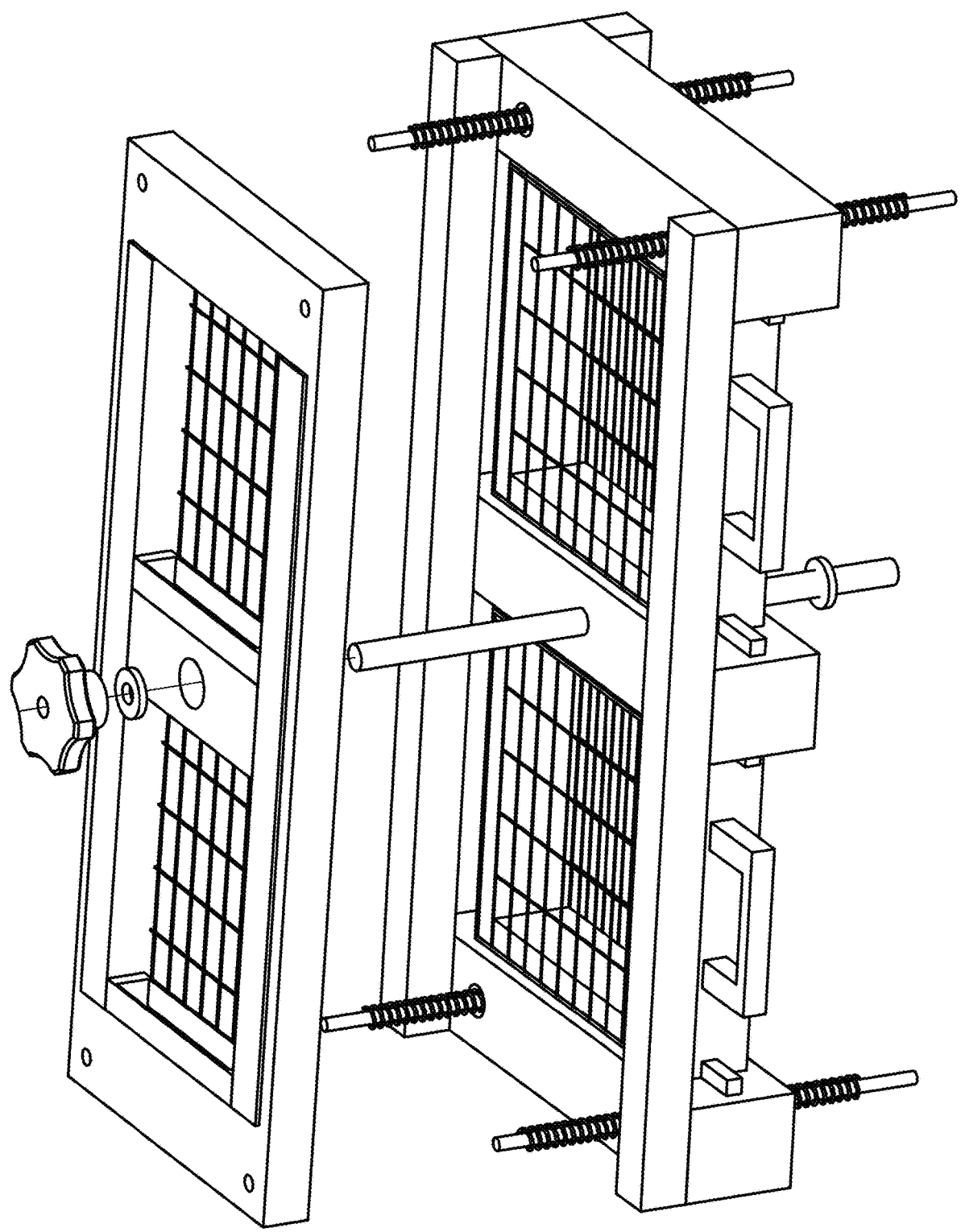
FIG. 2B is a cutaway view to illustrate the internal structure and functional relationships between key components of the Dial-A-Beak adjustable bird feeder. This view allows for a clearer understanding of how the movable faces interact with the food cages, threaded rod, compression springs, and spring guides within the frame. By removing portions of the outer frame, the cutaway view reveals details of the internal adjustment mechanism that are not visible in the external perspective or front views. It shows the alignment of the spring guides and compression springs, the positioning of the threaded rod in relation to the faces, and how the food cages are seated within the frame slots. The cutaway view is essential for demonstrating the internal operation of the adjustment mechanism, ensuring that the functional aspects of the invention are clearly and completely disclosed as required for patent examination.
Figure 2C:
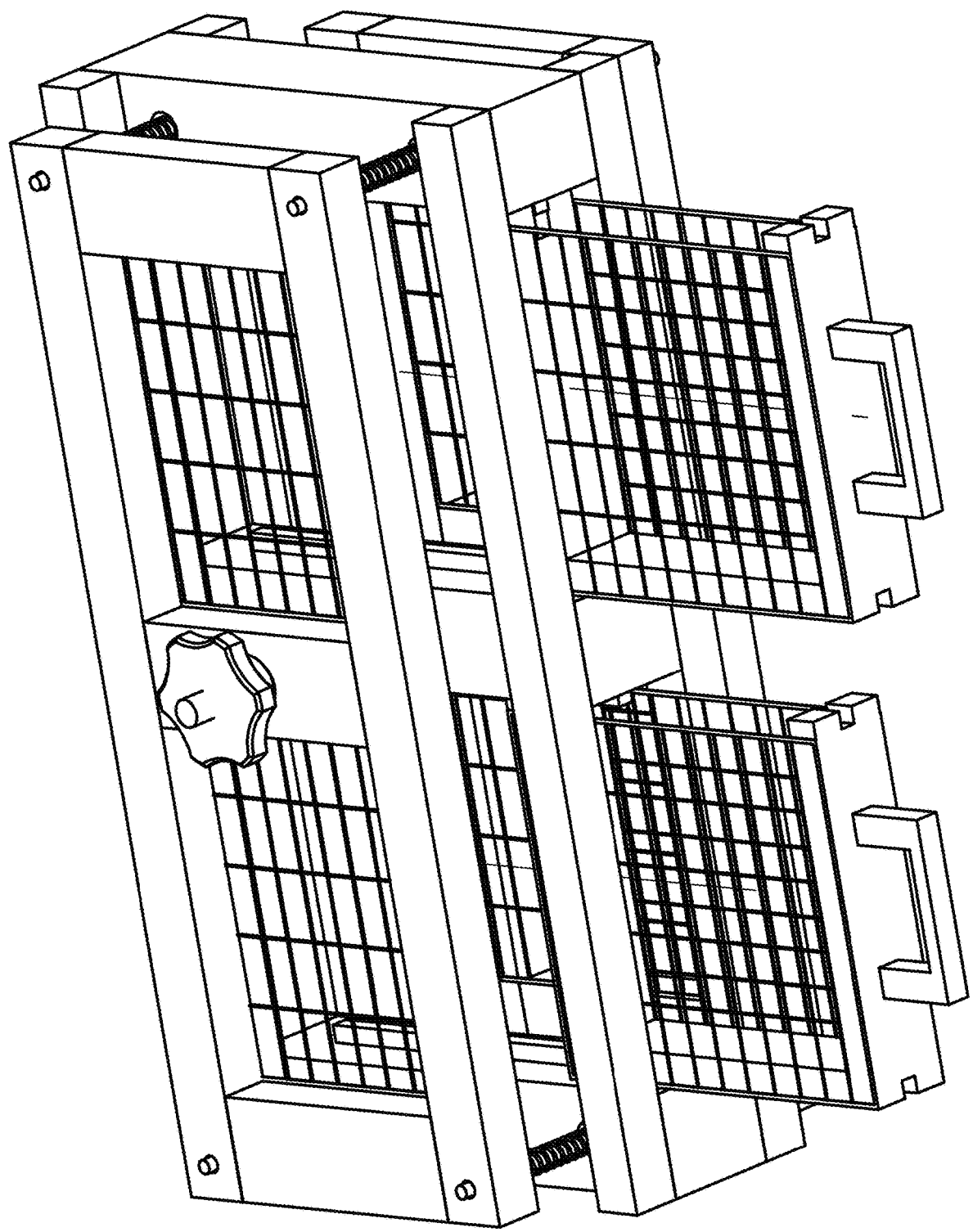
FIG. 2C illustrates the operation of the food cages within the Dial-A-Beak adjustable bird feeder. This figure shows how the food cages are designed to slide into and out of the frame slots, allowing for easy loading and replacement of food. The food cages are positioned one above the other in a stacked configuration, fitting securely into the designated slots within the frame. The figure highlights how the alignment of the food cages with the movable faces can be adjusted to control the aperture size, thereby regulating access to the food based on the beak length of different bird species. The secure fit of the food cages within the frame slots ensures that the cages remain stable during feeding, even when birds such as woodpeckers apply force while attempting to break apart the food. This configuration also facilitates easy maintenance and cleaning of the feeder while maintaining the functional selectivity of the feeding access.
Figure 3:
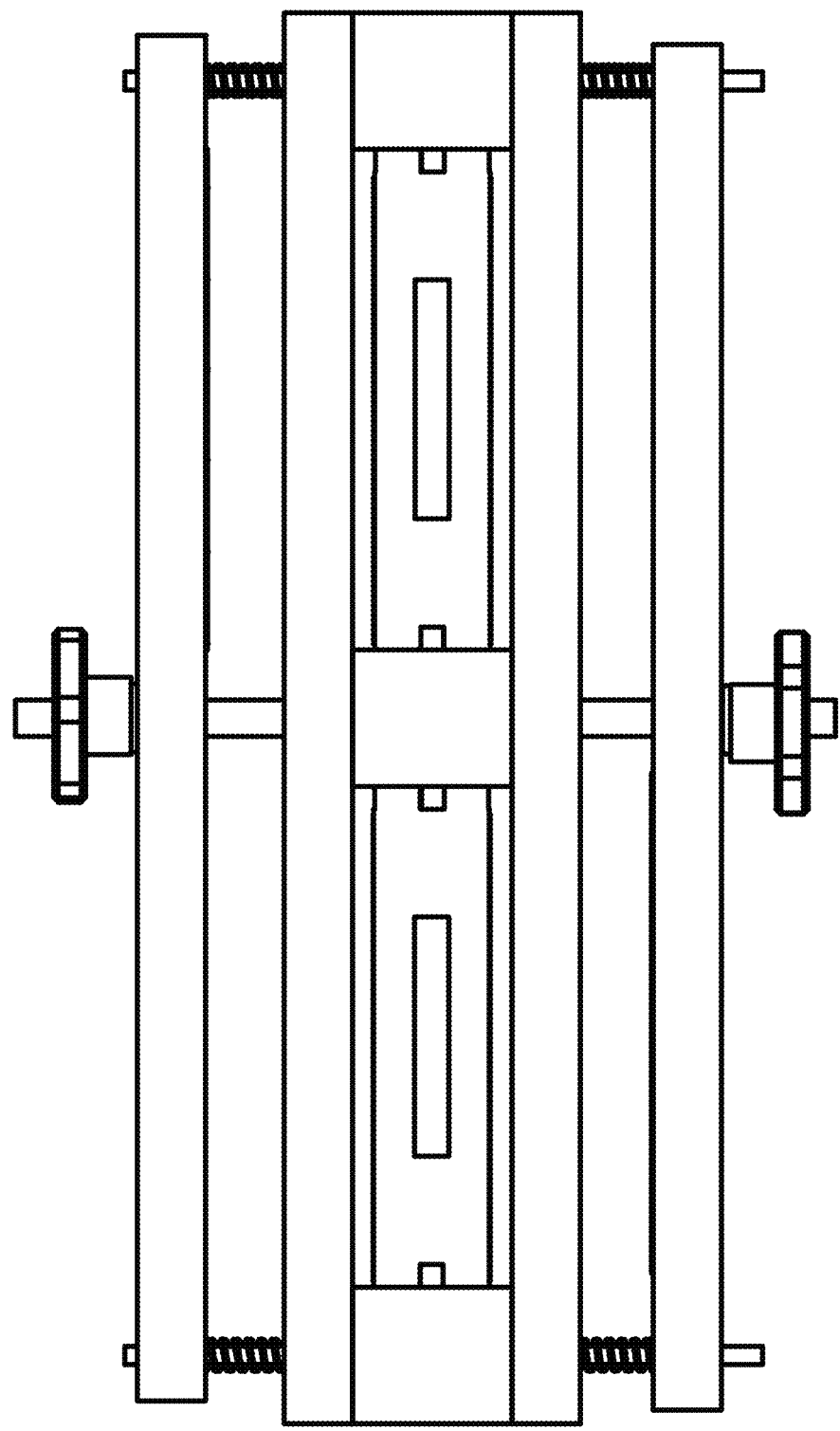
FIG. 3 is a right-side view of the Dial-A-Beak adjustable spring-assisted bird feeder, illustrating the side from which the food cages are loaded.
Figure 4:
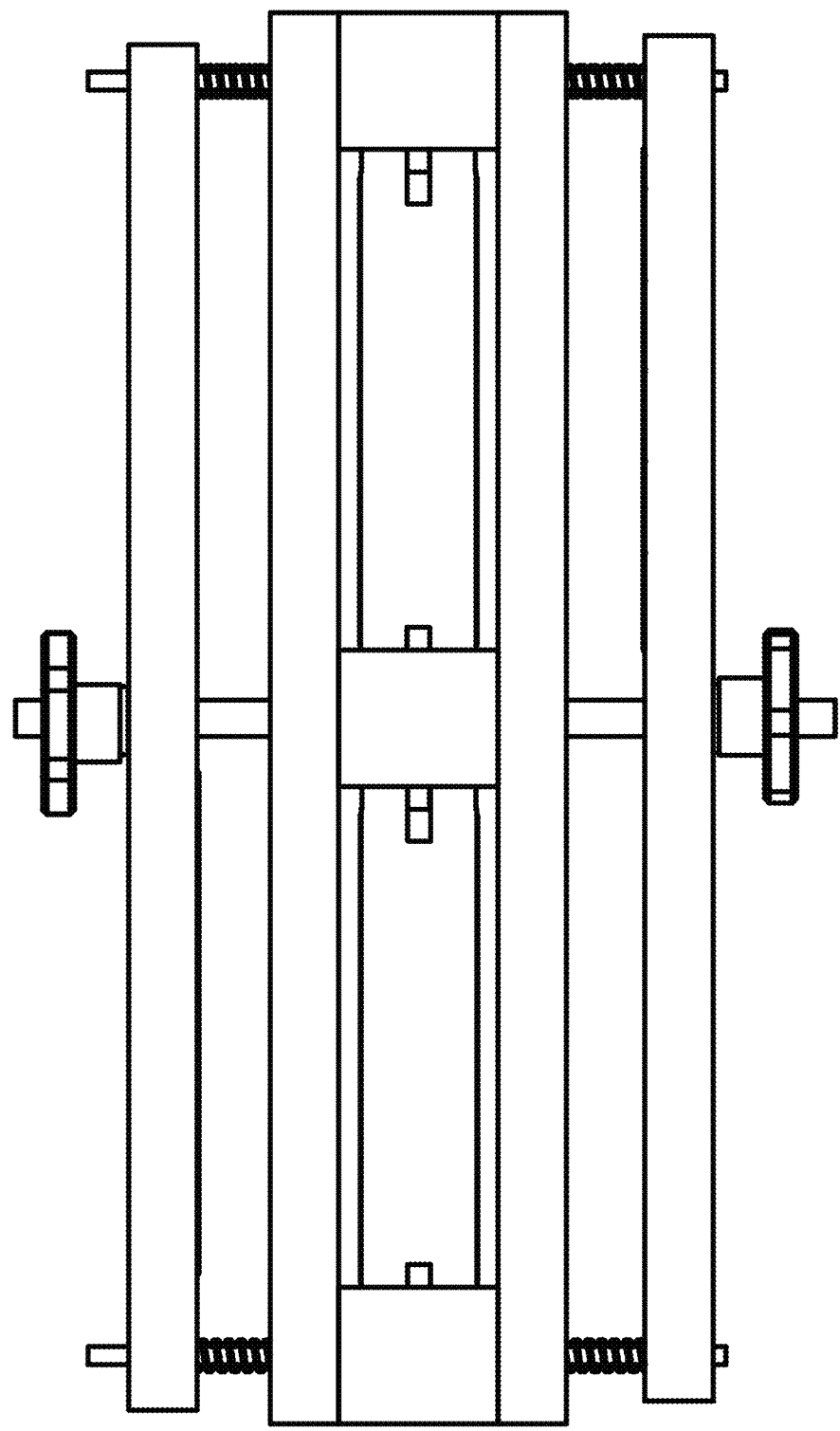
FIG. 4 is the left-side view.
Figure 5:
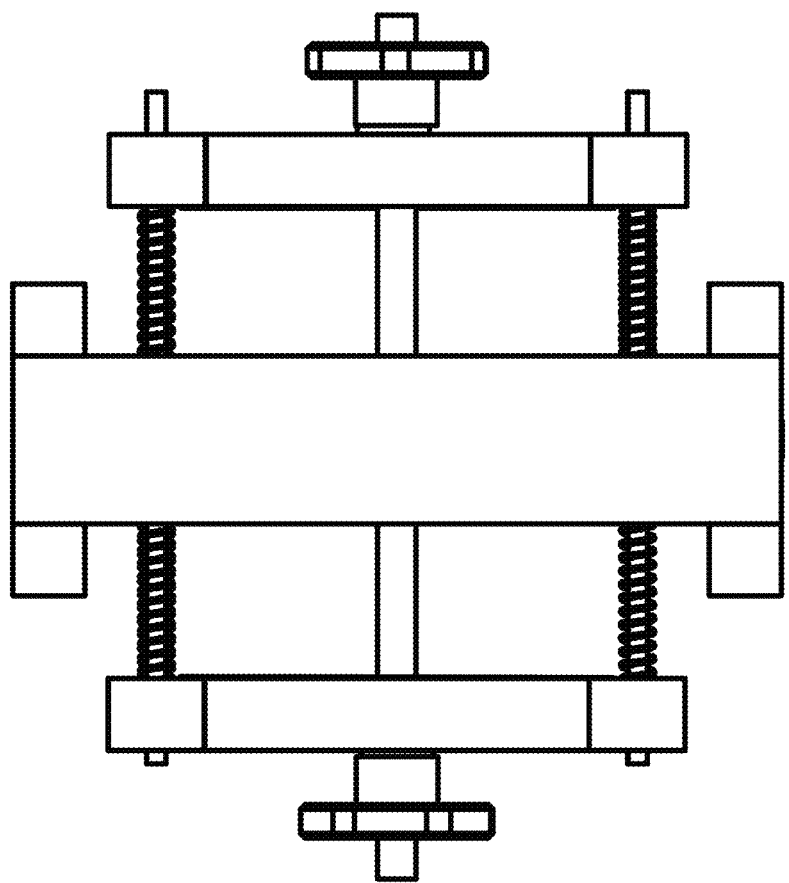
FIG. 5 is the top view.
Figure 6:
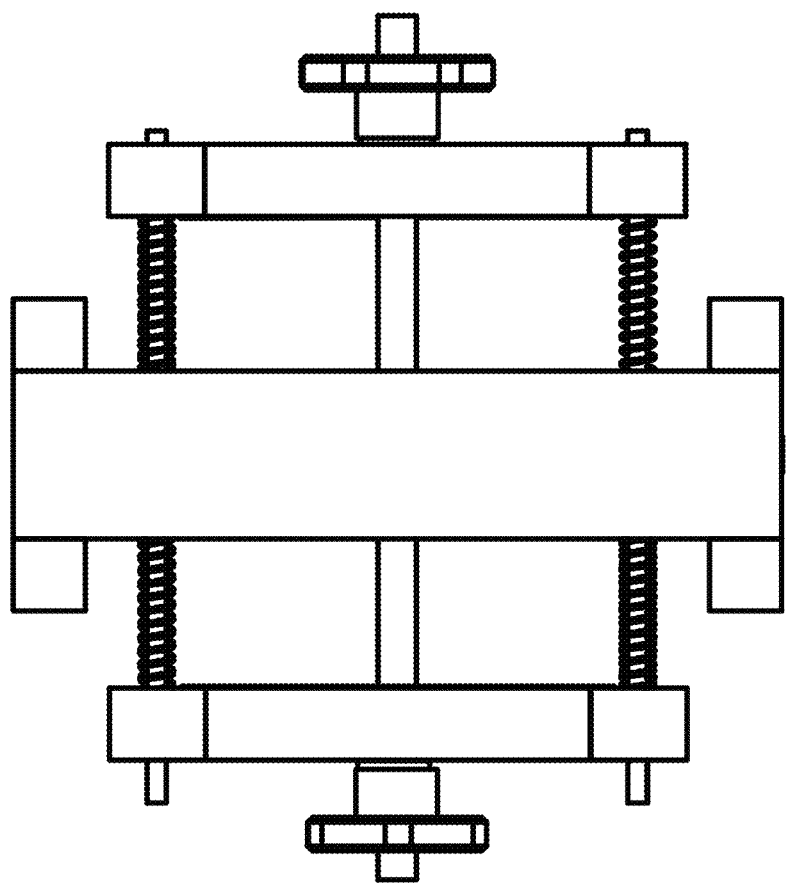
FIG. 6 is the bottom view.

The housing (21) includes integrated rails designed to stabilize the food cage (22) during operation. The food cage (22) holds the bird's food and slides within the housing (21) along the stabilizing rails. The food cage grill (24) is positioned at the front of the food cage (22) to regulate access based on beak length. The front grill (23) of the housing (21) serves as the primary barrier controlling feeding access when the food cage (22) is adjusted. The threaded rod (25) inserts through both the housing (21) and the food cage (22), enabling linear movement of the food cage (22) when rotated. The control knob (27) allows for clockwise and counterclockwise rotation of the threaded rod (25), thereby advancing or retracting the food cage (22) relative to the front grill (23). Washers (26) are placed between the food cage (22) and the threaded rod (25), protecting the food cage (22) by absorbing force applied during adjustment. This exploded view demonstrates the mechanical operation of the single-cage design, highlighting how the components interact to provide selective feeding access without using springs.

DETAILED DESCRIPTION OF THE DRAWING

The Dial-A-Beak adjustable bird feeder is designed to regulate access to bird food based on the anatomical characteristics of different bird species, specifically beak length. The feeder incorporates a movable face mechanism that the user can adjust to increase or decrease the distance between the face and the food cage. This adjustment allows selective feeding by desired bird species while deterring access by nuisance birds and animals such as squirrels.

The feeder frame includes a lower frame support (1), middle frame support (2), and top frame support (3), providing overall structural integrity. Spring guides (4) are located at each corner of the frame and extend through the front and rear faces. A threaded rod (5) runs through both faces and enables the movement of the faces (9) via rotation. Compression springs (6) are positioned over the spring guides (4) and provide a spring-assisted mechanism for face adjustment. Control knobs (7) are attached to each end of the threaded rod (5), allowing users to rotate the rod clockwise or counterclockwise to move the faces (9). Washers (11) are placed between the threaded rod (5) and the faces (9), ensuring smooth operation during adjustments.

Food cages (8) fit securely into frame slots in a stacked configuration. The alignment of the food cages (8) with the movable faces (9) can be adjusted to control aperture size, regulating access to the food based on the beak length of feeding birds. Crumb collection trays (12) located at the bottom of each feeding compartment collect fallen food fragments, which remain accessible to birds while protecting the middle and bottom sections of the feeder frame.

Figure 7:
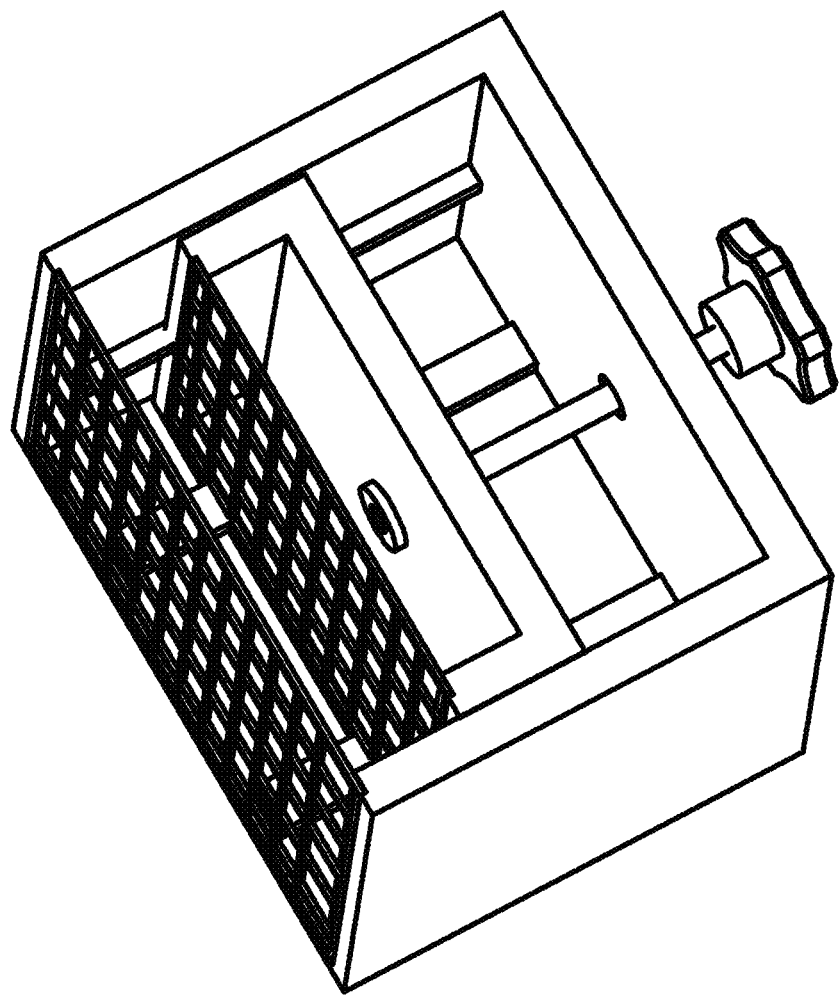
FIG. 7 is a perspective view of the single-cage version of the Dial-A-Beak adjustable bird feeder. The figure illustrates the overall configuration of the device, showing the relationship between the food cage, housing, front grill, and adjustment mechanism. In this version, the adjustment mechanism operates without springs, relying on a user-operated threaded rod and control knob to move the food cage forward and backward within the housing. The guiding system ensures stability and alignment of the food cage during operation, enabling precise distance adjustments to regulate feeding access based on beak length. The figure provides a three-dimensional representation of the single-sided design, highlighting the simplified construction compared to the spring-assisted model while maintaining the core functionality of selective feeding.
Figure 8:
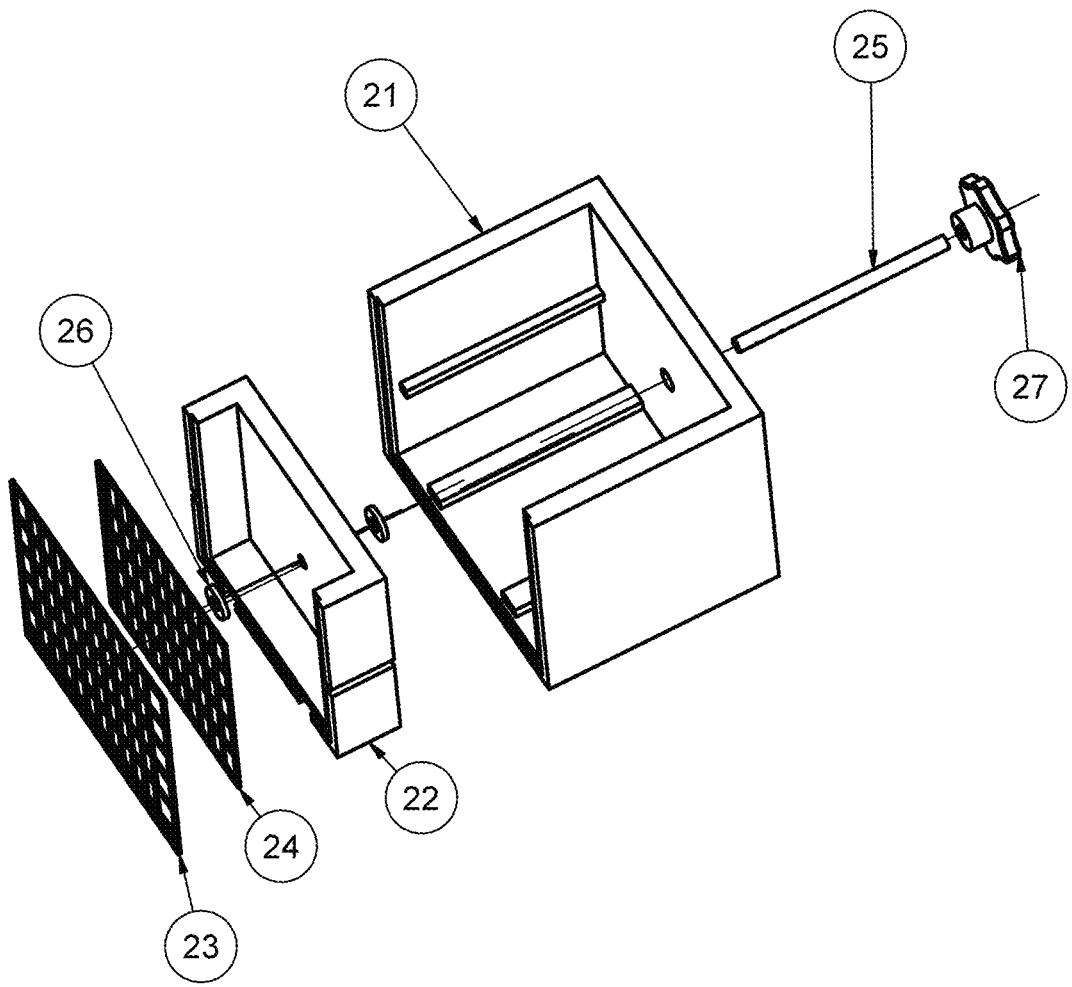
FIG. 8 presents an exploded view of the single-cage embodiment of the Dial-A-Beak adjustable bird feeder, detailing its primary mechanical components and their interrelations. To prevent confusion between this and the spring-assisted version, distinct part numbers have been assigned to components, even when they serve analogous functions in adjusting the distance between the movable face and the food cage.

Angled aluminum fittings (13) are located on each side of the front and rear faces, providing structural support and protection from damage caused by bird beaks. The single-cage version of the feeder, shown in FIG. 7, operates without compression springs. In this configuration, a threaded rod (25) and control knob (27) provide the necessary adjustments. The housing (21) includes integrated rails that stabilize the food cage (22) during movement. The food cage grill (24) regulates access in coordination with the front grill (23) of the housing. Washers (26) protect the food cage (22) by absorbing force during adjustments.

The single-cage version operates on the same principle as the spring-assisted model, allowing selective feeding based on beak length. However, it uses a more straightforward mechanical design without compression springs. The adaptability of the Dial-A-Beak feeder will enable it to accommodate various bird food types, including suet, seeds, nuts, and fruits, by modifying the cage design accordingly.

The adjustment mechanism may include various user-controlled devices such as hand-operated knobs, levers, cranks, threaded rods with control knobs, rotary handles, or similar mechanical devices that allow a user to manually adjust the position of the movable face through direct physical manipulation. Alternative adjustment mechanisms include an electronically operation mechanism, a motor-driven mechanism, a pneumatic actuator, a hydraulic actuator, a hydraulic adjuster, cam-based systems, magnetically assisted sliders, gears. These mechanisms provide tactile feedback and precise control over the adjustment process, enabling users to fine-tune the feeding access distance based on the specific beak lengths of target bird species.

The integrated rails may alternatively include telescoping tracks, sliding grooves, roller-based guides, magnetically assisted sliders, gear-driven assemblies, tension-based cable systems, electronic actuators, pneumatic or hydraulic actuators, or any equivalent mechanical, electrical, or magnetic system designed to ensure precise aperture adjustments, maintains proper alignment of the food cage within the housing during feeding operations, and prevents lateral or vertical displacement of the food cage.

The food cage includes materials selected from the group consisting of metals, including aluminum and stainless steel; plastics, including UV-resistant polymers; composite materials; or any other material suitable for outdoor use and maintaining structural integrity. Aluminum offers lightweight construction with excellent weather resistance, while stainless steel provides superior strength and corrosion resistance. The crumb collection tray (12) comprises a formed aluminum tray positioned at the bottom portion of each food cage. The tray protects the middle and bottom portions of the feeder frame from food debris and moisture while providing an accessible feeding area for birds to consume fallen food fragments.

The invention claimed is:

1. An adjustable bird feeder comprising:
    a housing having a front face grill, a rear wall, two side walls, a base and an upper opening, the housing defining a fixed distance between the front face grill and the rear wall;
    a food cage contained within the housing, the food cage comprising a front cage grill, a rear wall, two side walls, a base and an upper opening configured to provide insertion of bird food, the food cage further configured to hold bird food and move within the housing;
    a rail system disposed within the housing and configured to guide the movement of the food cage toward and away from the front face grill; and
    an adjustment mechanism configured to move the food cage along the rail system toward and away from the front face grill to regulate access to the bird food within the food cage based on beak length;
    wherein the adjustment mechanism is without springs.

2. The adjustable bird feeder of claim 1, wherein the adjustment mechanism is selected from the group consisting of threaded rods, gears, cam-based systems, hydraulic adjusters, and magnetically assisted sliders.

3. The adjustable bird feeder of claim 1, comprising: wherein the food cage being constructed from materials selected from the group consisting of metals, including aluminum and stainless steel; plastics, including UV-resistant polymers, composite materials, or other suitable materials for outdoor use and maintaining structural integrity.

4. The adjustable bird feeder of claim 1, wherein the food cage is adaptable to hold various bird food types, including suet, seeds, nuts, and fruits.

5. The adjustable bird feeder of claim 1, wherein access to the bird food is further controlled by adjustable slot apertures on the front cage grill, configured to regulate feeding based on how different bird species use their mandibles to grasp food.

6. The adjustable bird feeder of claim 1, wherein the adjustment mechanism comprises one or more systems selected from the group consisting of: electronic actuators, tension-based cable systems, or pneumatic components, capable of adjusting the distance between the front face grill and the food cage.

7. The adjustable bird feeder of claim 1, wherein the food cage is positionable within the housing to adjustably align with the front face grill, thereby controlling an aperture size of the front face grill for selective food access.

8. An adjustable bird feeder comprising:
    a housing having an upper frame support, a lower frame support, and four corner frame supports, the housing further defining a first face side and a second face side;
    a pair of slots formed by and within boundaries of the upper frame support, the lower frame support, and four corner frame supports, and extending perpendicular to a vertical axis of the first face side and the second face side;

at least two food cages configured to hold bird food, the at least two food cages are positioned one above the other in a stacked configuration, each food cage of the at least two food cages slidable in and out of the pair of slots, perpendicular to the vertical axis of the first face side and the second face side, to enable easy loading and replacement of bird food;

two movable faces, one movable face of the two movable faces is attached to the housing on the first face side and one movable face of the two movables faces is attached to the housing on the second face side, adjacent the at least two food cages;

a first set of compression springs supported on the upper frame support of the housing and a second set of compression springs supported on the lower frame support of the housing to support controlled movement of the two movable faces; and an adjustment mechanism configured to move the two movable faces toward and away from the at least two food cages;

wherein the adjustment mechanism comprises at least one of: a threaded rod and knob assembly, an electronically-operated mechanism, a motor-driven mechanism, and a pneumatic or hydraulic actuator;

wherein alignment of the at least two food cages with the two movable faces are adjusted to control the size of openings of the feeder and regulate access to bird food within the at least two food cages based on beak length.

9. The adjustable bird feeder of claim 2, wherein the first set of compression springs and the second set of compression springs, when compressed, decrease a distance between the two movable faces and the at least two food cages, allowing access to birds with shorter beaks; and when released, increase the distance between the two movable faces and the at least two food cages to restrict access to shorter-beaked birds.

10. The adjustable bird feeder of claim 8, wherein the at least two food cages are composed of materials selected from the group consisting of metals, including aluminum and stainless steel; plastics, including UV-resistant polymers; composite materials; or other suitable materials for outdoor use and maintaining structural integrity.

11. The adjustable bird feeder of claim 8, wherein the two movable faces include aluminum side panels configured to protect the bird feeder from indiscriminate beak damage by feeding birds.

12. The adjustable bird feeder of claim 8, further comprising an aluminum tray positioned below each food cage of the at least two food cages, the tray being configured to protect a middle frame support and the lower frame support and to collect bird food fragments falling from the at least two food cages, thereby providing an accessible area for birds to consume fallen bird food.

* * * * *